(12) United States Patent
Rohrig et al.

(10) Patent No.: US 10,753,378 B2
(45) Date of Patent: Aug. 25, 2020

(54) FLUID-ACTUATED DIAPHRAGM DRIVE, AND VALVE ARRANGEMENT WHICH IS EQUIPPED THEREWITH

(71) Applicant: FESTO SE & Co. KG, Esslingen (DE)

(72) Inventors: Harald Rohrig, Spiesen-Elversberg (DE); Andreas Weisang, Gersheim (DE)

(73) Assignee: FESTO SE & Co. KG, Esslingen (DE)

( * ) Notice: Subject to any disclaimer, the term of this patent is extended or adjusted under 35 U.S.C. 154(b) by 0 days.

(21) Appl. No.: 16/080,498

(22) PCT Filed: Jul. 11, 2016

(86) PCT No.: PCT/EP2016/066400
§ 371 (c)(1),
(2) Date: Aug. 28, 2018

(87) PCT Pub. No.: WO2018/010760
PCT Pub. Date: Jan. 18, 2018

(65) Prior Publication Data
US 2019/0063470 A1 Feb. 28, 2019

(51) Int. Cl.
*F16K 31/126* (2006.01)
*F15B 15/10* (2006.01)
*F15B 13/04* (2006.01)

(52) U.S. Cl.
CPC .......... *F15B 15/10* (2013.01); *F15B 13/0407* (2013.01); *F16K 31/126* (2013.01); *F16K 31/1262* (2013.01)

(58) Field of Classification Search
CPC ..... F16K 31/126; F16K 31/1262; F15B 15/10
See application file for complete search history.

(56) References Cited

U.S. PATENT DOCUMENTS

| 3,139,898 A | * | 7/1964 | Wiltgen | G05D 16/0683 |
| | | | | 137/454.6 |
| 3,503,307 A | * | 3/1970 | Migdal | F16J 3/02 |
| | | | | 92/98 R |
| 3,538,942 A | * | 11/1970 | Lyall | C02F 1/42 |
| | | | | 137/454.6 |

(Continued)

FOREIGN PATENT DOCUMENTS

| CN | 103443477 A | 12/2013 |
| CN | 105408640 A | 3/2016 |
| DE | 102007059922 A1 | 6/2009 |

(Continued)

*Primary Examiner* — F Daniel Lopez
(74) *Attorney, Agent, or Firm* — Hoffman & Baron, LLP

(57) ABSTRACT

A fluid-actuated diaphragm drive and a valve arrangement which is equipped therewith, wherein the diaphragm drive has a drive housing with two drive housing parts which are attached to one another axially. An insert body which preferably consists of plastic material and delimits at least one length section of an operating chamber which can be loaded with a fluid is inserted into each of the drive housing parts, wherein a drive diaphragm which is movement-coupled to an output member is clamped in between the two insert bodies. A seal structure which is active between at least one of the insert bodies and the drive housing is capable of preventing an axial flow around the two insert bodies in the region which lies radially between them and the drive housing.

21 Claims, 4 Drawing Sheets

(56) References Cited

U.S. PATENT DOCUMENTS 3,980,273 A * 9/1976 Turner .................... F16K 21/00
251/366
5,392,807 A * 2/1995 Caudle ................ F16K 31/1221
137/316

FOREIGN PATENT DOCUMENTS

| DE | 102013016350 | 1/2015 |
|----|--------------|---------|
| EP | 2028377 | 2/2009 |
| EP | 2799747 | 11/2014 |

* cited by examiner

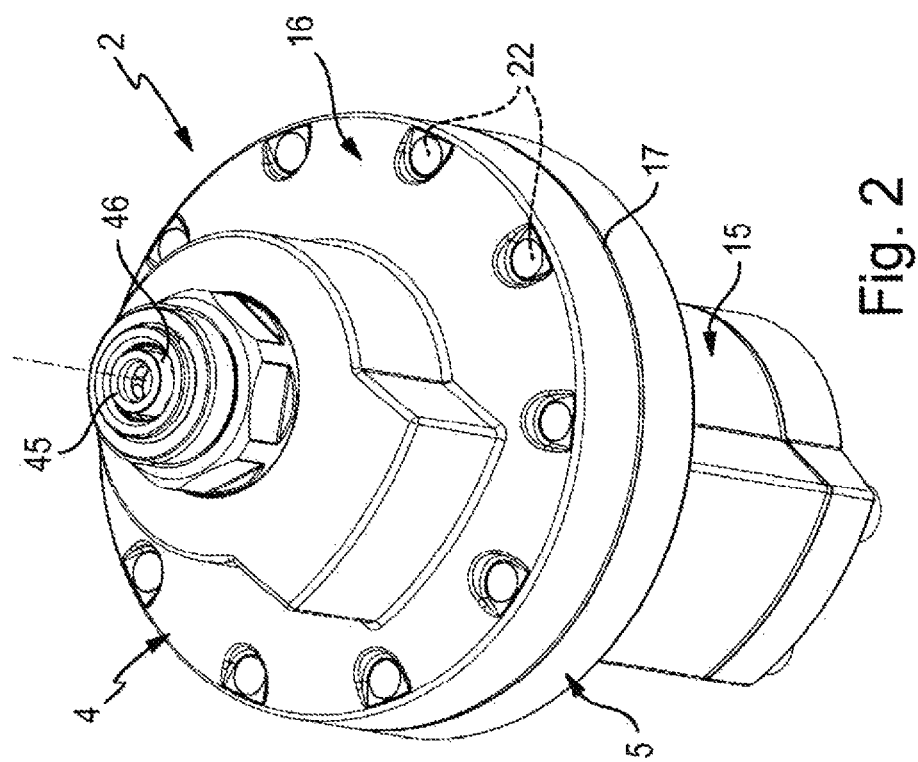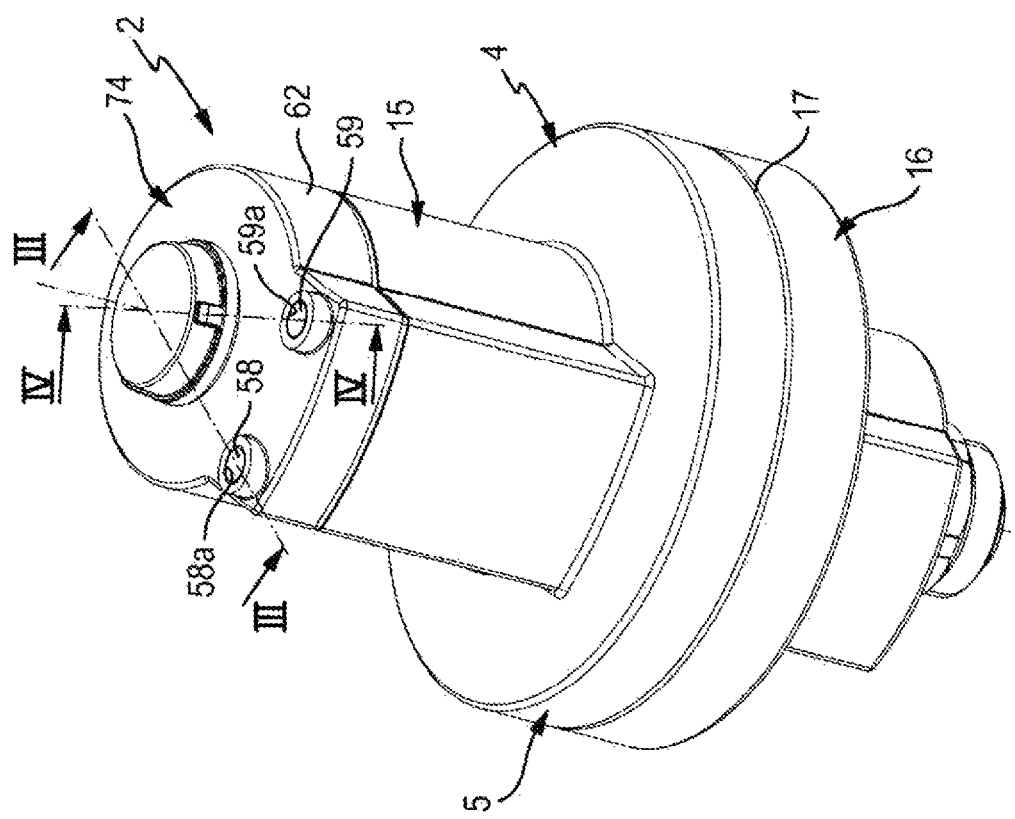

FLUID-ACTUATED DIAPHRAGM DRIVE, AND VALVE ARRANGEMENT WHICH IS EQUIPPED THEREWITH

This application claims priority based on an International Application filed under the Patent Cooperation Treaty, PCT/EP2016/066400, filed Jul. 11, 2016.

BACKGROUND OF THE INVENTION

The invention relates to a fluid-actuated diaphragm drive comprising a drive housing with two drive housing parts which are attached to one another axially in a joining region while together bounding a housing interior, wherein a drive diaphragm, which separates two axially adjacent operating chambers from each other in a fluid-tight manner is located in the housing interior and is motion-coupled to an output member wherein the drive diaphragm can be deflected axially by the application of fluid, controllable by means of a control passage structure formed at least partially in the drive housing, to at least one of the operating chambers, in order to induce an output movement of the output member.

The invention further relates to a valve assembly equipped with such a fluid-actuated diaphragm drive.

A diaphragm drive of the above type is known from DE 10 2013 016 350 B3 and comprises a drive housing which is surrounded on its outside by an additional shell housing for protection and which defines a housing interior divided into two fluid-actuable operating chambers by a drive diaphragm clamped between two drive housing parts of the drive housing. By a controlled application of fluid to at least one of the two operating chambers, the drive diaphragm can be deflected axially in one or the other direction for moving a rod-shaped output member attached to the drive diaphragm. The fluid is applied by means of a control passage structure which passes through the wall of the drive housing and comprises a plurality of control passages which terminate into the two operating chambers and through which a controlled supply and discharge of a drive fluid can be provided.

From EP 2 028 377 A2, a diaphragm drive is known which can be used as a drive source in a valve assembly and which has a housing in which a diaphragm tightly joined to the housing by its radially outer region is located. The diaphragm divides the housing interior into two operating chambers, to one of which a pressure fluid can be applied in a controlled manner while the other contains a spring device supported between the diaphragm and the housing and preloading the diaphragm and a valve spindle attached thereto towards a home position.

SUMMARY OF THE INVENTION

The invention is based on the problem of creating measures facilitating the optimised construction of a fluid-actuated diaphragm drive.

To solve this problem, it is provided in a fluid-actuated diaphragm drive of the type referred to above that the drive diaphragm is clamped at its outer edge section, while forming a seal, all around axially between insert bodies which are separate from the drive housing, each of which is inserted into one of the two drive housing parts and forms a peripheral wall section, adjoining the drive diaphragm, of the associated operating chamber, wherein a seal structure is located between at least one of the insert bodies and the drive housing.

The problem is further solved by a valve assembly with a valve fitting having a movable valve member and a with diaphragm drive designed in the above manner, which is located thereon and serves to actuate a valve member, and the output member of which is motion-coupled to the valve member of the valve fitting.

Owing to the insert bodies installed into the drive housing, at least those longitudinal sections of the two operating chambers which directly adjoin the drive diaphragm axially are not bounded directly by the drive housing but by one each of the insert bodies installed into the drive housing and separate therefrom. It has been shown that such separate insert bodies can be produced considerably more easily and cost-effectively, even in complex designs, than drive housings, which have to meet further requirements, such as the provision of a control passage structure through which the drive fluid required for the operation of the diaphragm drive can be carried. It is, for example, possible to shape the insert bodies such that the diaphragm can cling to them while being deflected and is not damaged by sharp edges. It is further advantageously possible to set up a series of diaphragm drives which are as standard equipped with identical drive housing parts fitted with suitably adapted insert bodies for the specific tailoring of the individual diaphragm drives. If required, the combination of the insert bodies with the drive housing parts furthermore facilitates in intermediate regions the creation of chambers which can be used for a fluid flow, in particular as parts of the control passage structure. The seal structure acting between the drive housing and one or both of the insert bodies expediently prevents an axial flow-past of fluid in the region between the insert bodies and the drive housing. The seal structure in particular provides a fluid-tight bulkhead between axially adjacent zones in the circumferential region of the insert bodies, so that a transfer of a drive fluid used for the actuation of the diaphragm drive and fed into one of the two operating chambers into the other operating chamber is prevented. With the aid of the seal structure, it is furthermore possible to define, if required, one or more hollow spaces between the drive housing and the insert bodies, which can be used for the passage of the drive fluid, particularly easily.

Advantageous further developments of the invention emerge from the dependent claims.

The seal structure sealing between the arrangement of insert bodies and the drive housing is expediently designed separately from the insert bodies and/or the drive housing and expediently comprises at least one sealing ring, in particular an O-ring, arranged to be coaxial with the insert bodies. The seal structure can comprise only one such sealing ring or several sealing rings spaced axially from one another. Each sealing ring forms a seal section which seals against at least one insert body on the one hand and against at least one drive housing part on the other hand.

Instead of an independent sealing ring, each seal section can alternatively be designed as a sealing material coating fixed by adhesive force, in particular by injection moulding, to an insert body or to the drive housing part.

A seal section can also be represented directly by the outer radial edge region of the drive diaphragm if the drive diaphragm is designed such that it projects radially beyond the two insert bodies on the outside and with its projecting edge section acts together with the drive housing to form a seal.

The walls of the insert bodies are preferably designed without openings. This facilitates a particularly simple production. Fluid flows to be applied to the drive diaphragm therefore do not pass through the walls of the insert bodies.

The control passage structure therefore preferably does not penetrate the walls of the insert bodies.

In a preferred variant, precisely two axially spaced annular seal sections are provided between one of the two insert bodies and the associated drive housing part. In this context, it is expedient if only a single annular seal section is assigned to the other insert part. In principle, however, each insert body can cooperate with precisely one seal section or with several seal sections of the seal structure.

One preferred variant of the insert bodies provides for their design as annular bodies. As a result, each insert body is axially open towards the drive diaphragm on the one hand and towards the opposite boundary wall of the associated operating chamber on the other hand. This advantageously facilitates the supply and discharge of the drive fluid required for application to the drive diaphragm through the ring interior space enclosed by the annular insert body and forming a longitudinal section of the associated operating chamber.

If the insert bodies are annular, in particular, the end wall of the associated operating chamber, which bounds it on the side axially opposite the drive diaphragm, is formed by the drive housing. This end wall is preferably located at an axial distance from the maximum axial stroke range of the deflectable drive diaphragm, so that a contact between the drive diaphragm and the end wall formed by the drive housing is always prevented.

In principle, it would be possible to clamp the two insert bodies together axially by clamping means acting between them, in order to combine them to an insert body assembly while holding the drive diaphragm clamped at the same time. It is, however, considerably more cost-effective to produce the diaphragm drive without direct clamping between the two insert bodies and by clamping the two insert bodies to each other and to the drive diaphragm only by means of the drive housing parts which accommodate them. When the drive housing is assembled, the two drive housing parts are axially clamped together by suitable clamping means, in particular locking screws, in such a way that they act from opposite axial sides on the two insert bodies and axially clamp them, together with the drive diaphragm engaged in between. In this way, there is no need for separate clamping measures acting between the insert bodies, so that manufacturing and assembly costs can be saved.

Each insert body expediently comprises a support section which is axially remote from the respectively other insert body and on which the drive housing part equipped with the respective insert body acts by means of a mating support section formed thereon.

In a preferred variant of the diaphragm drive, at least one and preferably each insert body forms, together with the drive housing part accommodating it, a fluid duct chamber belonging to the control passage structure. With the aid of the seal structure, an undesirable axial fluid transfer between axially adjacent regions can be avoided. At least one and preferable each of the fluid duct chambers is preferably an annular chamber arranged concentrically around the associated insert body, so that the fluid flowing therein can be distributed around the respective insert body. In this context, it is advantageously possible to arrange sections of the control passage structure formed in the wall of the drive housing in such a way that they terminate in different circumferential regions of a fluid duct chamber, so that the routing of the fluid between different radial sides of the drive unit can be changed by means of a fluid duct chamber. This, for example, allows for a particularly simple bypassing of the arrangement of insert bodies if drive fluid fed into the drive housing on the one axial side of the drive diaphragm is to be guided to the operating chamber on the opposite side of the drive diaphragm.

In this way, a design is possible in particular in which the control passage structure has a connecting port located on the one axial side of the drive diaphragm on the outside of the drive housing and usable for fluid feed and fluid discharge and in which the control passage structure is routed within the drive housing towards the other axial side of the drive diaphragm by means of at least one fluid duct chamber, in order to communicate with the operating chamber located there.

In annular insert bodies, it is advantageous if the mutually facing front annular openings of the insert bodies have a larger cross-section than the opposite rear annular openings. In this way, a particularly advantageous shaping can be chosen for that peripheral wall section of an operating chamber which is represented by an insert body and by which the drive diaphragm can be supported to protect it against excessive expansion.

A particularly expedient structure of the insert bodies provides that the insert bodies are designed to be annular, each having a radially inward inner ring section forming a peripheral wall section of an operating chamber and a radially outward outer ring section coaxially enclosing the inner ring section and being substantially hollow-cylindrical. The two ring sections are joined integrally to each other on the front side of the insert body facing the drive diaphragm. The annular body of the insert body can at least partially be approximately V-shaped if viewed in cross-section, resulting in an intermediate space with a cross-section widening from the front towards the rear of the insert body radially between the two ring sections.

For the radial inner surface of that section of the insert body which forms a peripheral wall section of an operating chamber, a concave design is recommended on the side facing the operating chamber. The transition region between this concave peripheral wall section and the front side of the insert body expediently has a convex curvature, the radius being relatively large to protect the diaphragm against damage while it is being deformed.

The two drive housing parts are expediently made of metal, and an aluminium material or stainless steel is preferably selected. The insert bodies can likewise consist of metal but are preferably made of a plastic material which, by injection moulding for example, facilitates a particularly cost-effective production of insert bodies of any complex design.

If the diaphragm drive is to be used as a double-acting diaphragm drive, the control passage structure is realised in such a way that it communicates with both operating chambers and a preferably mutually independent, controlled fluid application is possible in respect to both operating chambers.

A diaphragm drive of single-acting design can be realised particularly easily by providing that the control passage structure, insofar as it is used for fluidic activation, communicates with only one of the two operating chambers or—if communicating with both operating chambers—is used for only one of the two operating chambers. In the other operating chamber, there is in this case provided a spring device acting between the drive diaphragm and the drive housing and preloading the drive diaphragm and thus the drive member in a resiliently yielding manner into a home position. In combination with an integration of the diaphragm drive into a valve assembly, a valve assembly of the "normally open" or "normally closed" type can optionally be realised.

The drive member is preferably designed to be rod-shaped and arranged such that it passes outwards in a slidable manner through at least one of the drive housing parts. A longitudinal section of the drive member which projects from the drive housing can be used for coupling to a movable valve member of a valve fitting if the diaphragm drive is designed as a component of a valve assembly. If required, the drive member can also be used as a display and/or control means, with the aid of which the current position of the drive member can be visualised or otherwise indicated and/or its current position can be detected in order to be used as a position signal by an electronic control unit.

BRIEF DESCRIPTION OF THE DRAWINGS

The invention is explained in greater detail below with reference to the accompanying drawing, of which:

FIG. 1 is a perspective external view of a preferred embodiment of the fluid-actuated diaphragm drive according to the invention, FIG. 2 shows the diaphragm drive from FIG. 1 as viewed from the axial underside in contrast to FIG. 1.

DETAILED DESCRIPTION OF THE PREFERRED EMBODIMENTS

Figure 3:
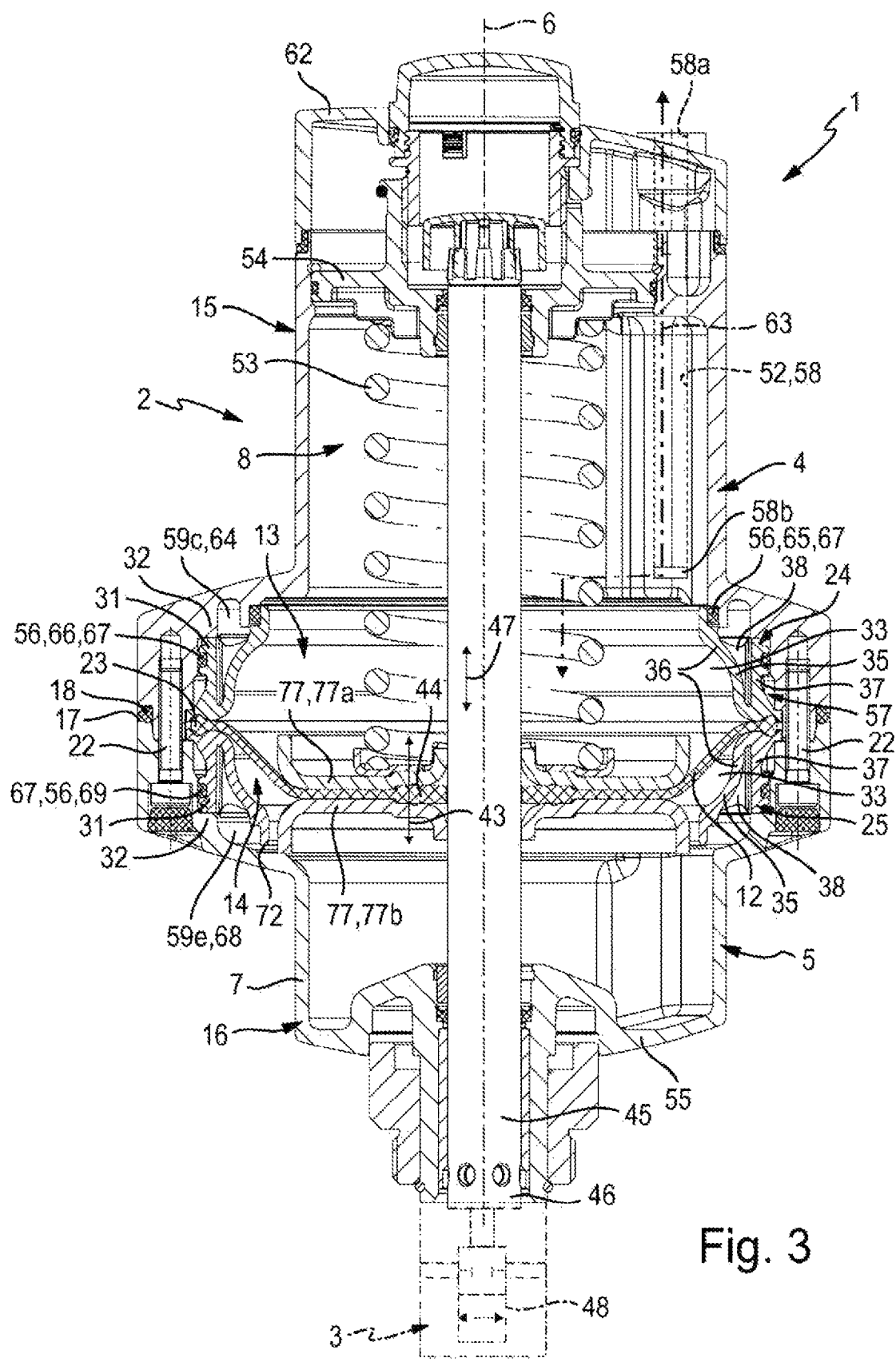
FIG. 3 is a longitudinal section through the diaphragm drive from FIGS. 1 and 2 along the sectional plane III-III from FIG. 1, with a valve fitting on which the diaphragm drive can be mounted to form a valve assembly indicated by a dot-dash line at the lower end of the diaphragm drive.

FIG. 3 shows a valve assembly identified in its entirety by the reference number 1 and composed of a fluid-actuated diaphragm drive 2 shown in longitudinal section and a valve fitting 3, which is equipped with this diaphragm drive 2 and only indicated by dot-dash lines. FIGS. 1, 2, 4 and 5 show the diaphragm drive 2 without the associated valve fitting 3. Together with the valve fitting 3, the valve assembly 1 preferably forms a process valve assembly which can be used in process control, e.g. in chemical and biochemical applications.

The diaphragm drive 2 is suitable for other drive applications as well, e.g. for use in production and assembly technology.

The diaphragm drive 2 has a housing 5, which is hereinafter identified as drive housing 5. The drive housing 5 is in particular a part of a drive unit 4 with a longitudinal axis 6, which is the longitudinal axis of the drive housing 5 as well.

The drive housing 5 has a drive housing wall 7, which encloses a housing interior 8 and which expediently also defines the outer surface of the drive housing 5, which can be seen from the outside.

In the housing interior 8, there is provided an elastically deformable diaphragm identified as drive diaphragm 12, which preferably consists of a material with rubber-elastic properties. The drive diaphragm 12 extends transversely to the longitudinal axis 6 and axially divides the housing interior 8 into two sub-chambers identified as first operating chamber 13 and second operating chamber 14. The drive diaphragm 12 is fluid-tight and therefore prevents a fluidic communication between the two operating chambers 13, 14.

The drive housing 5 is divided into two axially consecutive housing parts identified hereinafter as first drive housing part 15 and second drive housing part 16. In a joining region 17 extending transversely and in particular at right angles to the longitudinal axis 6, the two drive housing parts 15, 16 are fitted to each other axially, preferably with the interposition of a housing seal 18.

With the aid of clamping means 22, which may be locking screws in particular, the two drive housing parts 15, 16 are axially clamped together in the joining region 17, so that they form a coherent housing assembly in the form of the drive housing 5. The clamping means 22 are in particular distributed in a multiple arrangement around the longitudinal axis 6 in the manner of a flange joint, lying preferably on a circle line concentric with the longitudinal axis 6.

The drive diaphragm 12, which preferably has a circular external contour, has an annular continuous outer edge section 23 concentric with the longitudinal axis 6. The drive diaphragm 12 is fixed to this outer edge section 23 so as to be immovable relative to the drive housing 5. It is, however, not fixed directly to the drive housing 5, but rather by axial clamping between first and second insert bodies 24, 25, which are separate from the drive housing 5 and located in the housing interior 8 in an axially and radially immovable manner.

The first insert body 24 sits coaxially in the first drive housing part 15 and the second insert body 25 sits coaxially in the second drive housing part 16. Each drive housing part 15, 16 bounds an interior section 27, 28 of the housing interior 8, which interior section 27, 28 is axially open towards the respective other drive housing part 15, 16 via a front housing part opening 26 in the joining region 17. As the front housing part openings 26 of the two drive housing parts 15, 16 are in alignment with each other, they complete each other to form the housing interior 8.

Each of the insert bodies 24, 25 is installed into the interior section 27, 28 of the associated drive housing part 15, 16 through the front housing part opening 26 and in particular inserted axially. The installation depth is predetermined by cooperating stop means. In concrete terms, for forming the stop means each insert body 24, 25 has on the side remote from the joining region 17 at least one and preferably precisely one support section 31, with which it bears against a mating support section 32, which is preferably represented by a step at the inner surface of the drive housing wall 7.

The axial length and the axial position of the insert bodies 24, 25 are chosen such that, when installed into the associated drive housing part 15, 16, their axial front side is approximately flush with the joining region 17. Each insert body 24, 25 is preferably axially shorter than the interior section 27, 28 of the housing interior 8 which accommodates it.

Each of the two insert bodies 24, 25 is in particular designed to be annular and arranged to be coaxial with the longitudinal axis 6. Each annular insert body 24, 25 radially encloses on the outside an axially continuous interior identified as ring interior space 33 for easier differentiation. Each insert body 24, 25 has a front side facing the drive diaphragm 12 and a rear side remote from the drive diaphragm 12, the ring interior space 33 being open on the front side via a front annular opening 33a and on the rear side via a rear annular opening 33b. The front annular opening 33a of each insert body 24, 25 is framed by an annular clamping section 34 of the respective insert body 24, 25, which annular clamping section 34 is concentric with the longitudinal axis 6.

The drive diaphragm 12 projects with its outer edge section 23 axially between the facing clamping sections 34 of the two insert bodies 24, 25, between which it is compressed axially and thus clamped while forming a seal.

The flow of forces for the clamping force acting in this process runs through the clamping means 22 between the two drive housing parts 15, 16, from there via the axially mutually supporting support sections 31 and mating support sections 32 into the two insert bodies 24, 25, and from there via the two clamping sections 34 into the outer edge section 23 of the drive diaphragm 12.

The two insert bodies 24, 25 are therefore clamped together axially and to the drive diaphragm 12 placed in between solely by the axial force applied by the drive housing parts 15, 16 accommodating them.

The sections of the two operating chambers 13, 14 which axially adjoin the drive diaphragm 12 on both sides are each represented by the ring interior space 33 of one of the two insert bodies 24, 25, Each of these insert bodies 24, 25 defines a peripheral wall section 35 of the associated first or second operating chamber 13, 14.

The peripheral wall section 35 adjoins the annular clamping section 34 directly in particular. It is expediently contoured such that the ring interior space 33 has a larger diameter at the front side of the insert body 24, 25 than at the rear side. In other words: the front annular opening 33a has a larger cross-section than the rear annular opening 33b.

The insert body 24, 25 is a one-piece component in particular and preferably consists of a rigid plastic material. Other materials are also possible, however, in particular aluminium or a metal/polymer composite.

The two drive housing parts 15, 16 are expediently made of metal, in particular of aluminium or stainless steel.

A preferred design of the insert bodies 24, 25, which is realised in the illustrated embodiment, provides that the part which directly forms a peripheral wall section 35 of an operating chamber 13, 14 is a radially inward inner ring section 36, which is concentrically enclosed by a preferably hollow-cylindrical outer ring section 37 at its radial outside. The outer ring section 37 likewise integrally adjoins the clamping section 34 defining the front side of the insert body 24, 25. As the inner ring section 36 tends radially inwards towards the rear side, there is an intermediate space 38 widening towards the rear side and open towards the rear side of the insert body 24, 25 radially between the two ring sections 36, 37. The intermediate space 38 can be annular or limited locally to one or more points distributed along the ring circumference.

The support section 31 is expediently represented by the rear free end section of the outer ring section 37.

The insert body 24, 25 defines a radial inner surface 42 facing the operating chamber 13, 14. This is expediently shaped in such a way that it has, adjoining the clamping section 34, a convex inner surface section 42a and, adjoining this, a concave inner surface section 42b. If preferred, the radial inner surface 42 can be represented by the inner ring section 36.

In the region remote from the clamped outer edge section 23, the drive diaphragm 12 is deflectable in both directions of the longitudinal axis 6 while being elastically deformed. This deflecting movement of the drive diaphragm 12 is to be identified as drive movement 43 and is indicated by a double-headed arrow. In the drive movement 43, a power output section 44 of the drive diaphragm 12 which is radially spaced from the outer edge section 23 can be deformed, while performing the drive movement 43, between two maximally deflected positions, the first of which is illustrated in the drawing. The distance between the two maximally deflected positions defines the maximum stroke of the power output section 44 and thus of the drive movement 43.

An output member 45 which is movable relative to the drive housing 5 in the direction of the longitudinal axis 6 extends in the drive housing 5. The output member 45 is preferably designed to be rod-shaped, which applies to the illustrated embodiment. The output member 45 is guided in the housing for linear movement and passes through the wall of the drive housing 5, thus having an output section 46 which is accessible outside the drive housing 5. The rod-shaped output member 45 is oriented coaxially with the longitudinal axis 6.

The drive diaphragm 12 is secured to the output member 45 in the housing interior 8 by its power output section 44. As a result, the drive movement 43 is directly transmitted to the output member 45, which can therefore be driven to perform an output movement 47 indicated by a double-headed arrow, which is relative to the drive housing 4 and oriented in the direction of the longitudinal axis 6. The output movement 47 can be tapped at the output section 46, which in the illustrated embodiment is achieved by providing that the output section 46 is drive-coupled to a valve member 48 of the valve fitting 3 mentioned above. In this way, a valve member 48 can be actuated, for example to optionally open up or block a fluid flow through the valve fitting 3.

The drive movement 43 of the drive diaphragm 12 can be initiated by a controlled application of fluid which can be realised by means of a control passage structure 52 integrated into the drive unit 4. The control passage structure 52 facilitates the controlled infeed and discharge of a pressurised drive fluid relative to at least one of the two operating chambers 13, 14. In the illustrated embodiment, the control passage structure 52 is designed for a controlled application of fluid to both operating chambers 13, 14, but in practical applications it is used for the controlled application of fluid to only one of the two operating chambers 13, 14, i.e. to the second operating chamber 14 located below the drive diaphragm 12. The reason for this one-sided use of the controlled application of fluid is that the diaphragm drive 2 of the illustrated embodiment is designed to be single-acting and equipped with a spring device 53 which constantly preloads the drive diaphragm 12 towards one of its maximally deflected positions. In the illustrated embodiment, the drive diaphragm 12 is spring-loaded towards the first maximally deflected position which, in combination with the illustrated valve fitting 3, causes a closed position of the valve member 48, so that the valve assembly 1 is of the "normally closed" type. In this context, the spring device 53 is located in the first operating chamber 13 and is designed as a compression spring supported on the drive diaphragm 12 on the one hand and on a first end wall 54 of the first drive housing part 15, which completes the first operating chamber 13 on the side which is axially opposite the drive diaphragm 12, on the other hand.

Figure 4:
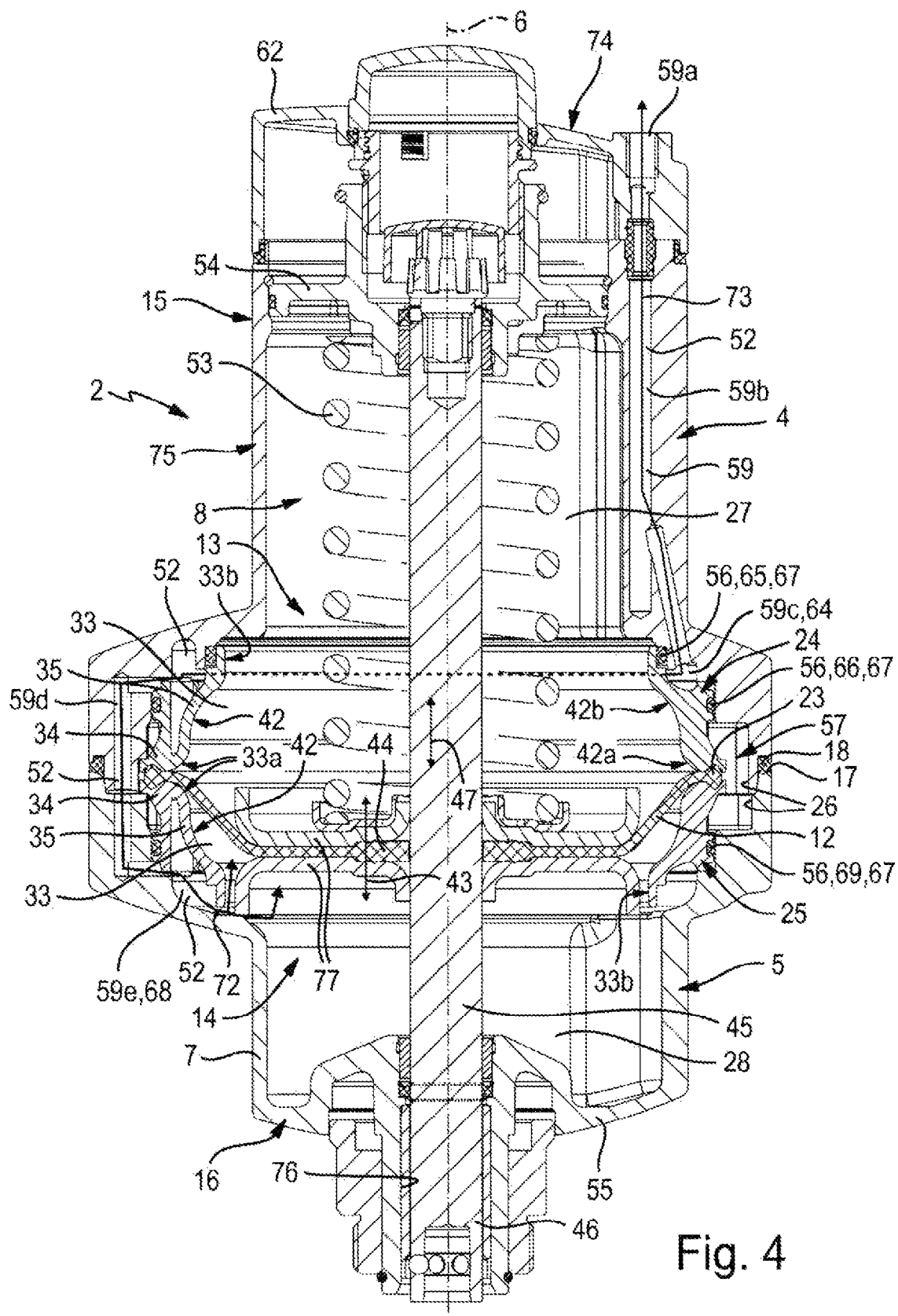
FIG. 4 is a longitudinal section through the diaphragm drive from FIGS. 1 to 3 along the sectional plane IV-IV.
Figure 5:
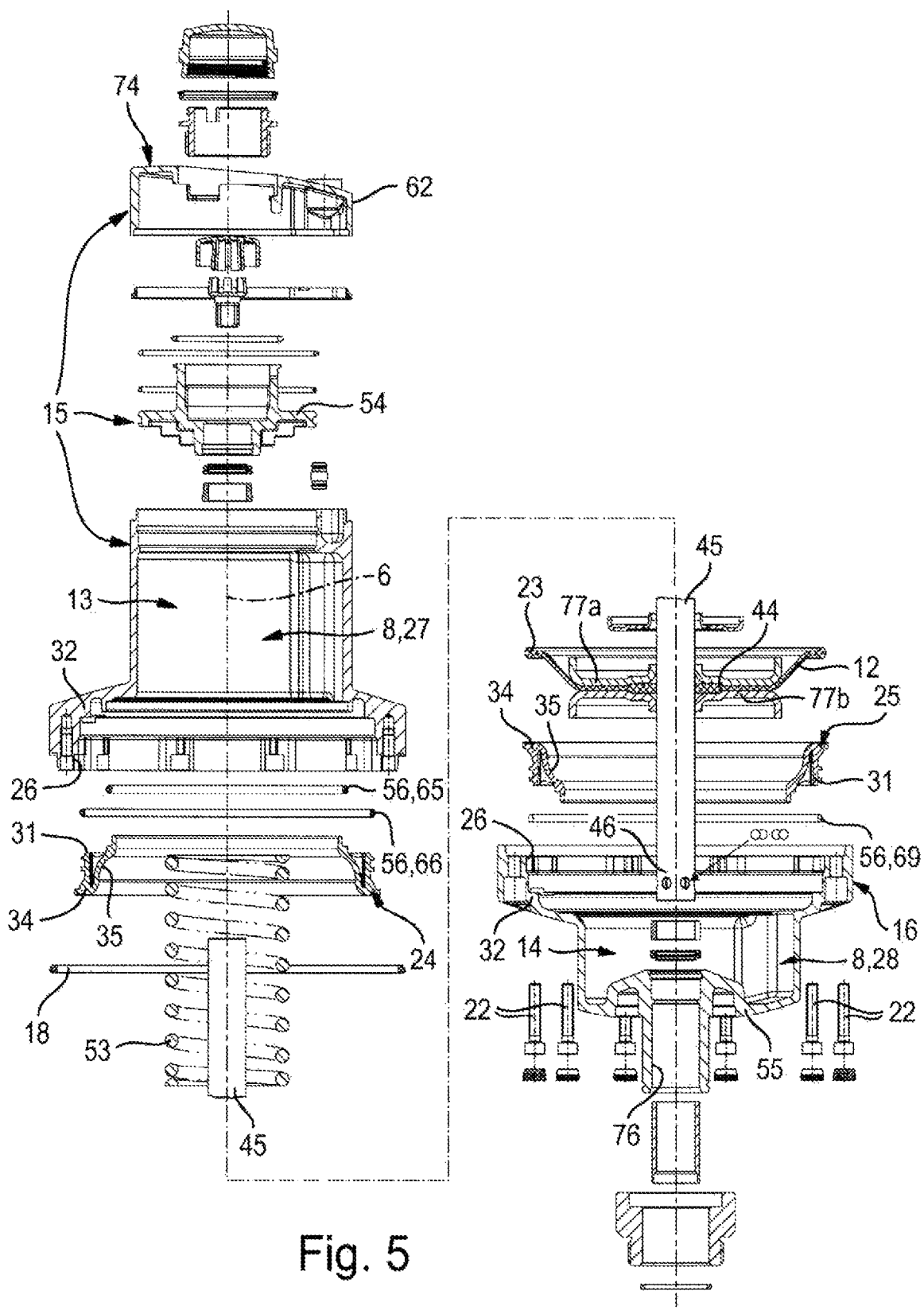
FIG. 5 is a longitudinal section through the diaphragm drive in a sectional plane corresponding to FIG. 3 and in an exploded view.

The diaphragm drive 2 can, however, alternatively be designed such that the drive diaphragm 12 is preloaded by a spring device 53 towards the second maximally deflected position opposed to that shown in FIGS. 3 and 4. In this case, the spring device 53 is located in the second operating chamber 14 and is again supported on the drive diaphragm 12 on the one hand and on the second end wall 55 belonging to the second drive housing part 16 and located axially opposite the drive diaphragm 12 on the other hand.

In the single-acting designs of the diaphragm drive 2, the drive movement 43 and the resulting positioning of the drive diaphragm 12 and thus of the output member 45 are initiated by the controlled application of fluid to that operating chamber 13, 14 which is not equipped with a spring device 53. This is described below with reference to the illustrated design, in which the spring device 53 is located in the first operating chamber 13.

It has to be said first that the drive unit 4 also comprises a seal structure 56 acting as a seal between the drive housing 5 and at least one of the two insert bodies 24, 25, which seal structure 56 preferably prevents an axial flow of drive fluid in the intermediate region 57 between the insert bodies 24, 25 and the drive housing 5. In this way, an uncontrolled transfer of operating fluid between the two operating chambers 13, 14 by an external flow around the two insert bodies 24, 25 can be eliminated.

When the drive diaphragm 12 is deflected axially by the application of fluid to an operating chamber 13, 14, it is inflated to some extent and can rest against the radial inner surface 42 of that insert body 24, 25 towards which it is deflected. The described design of the radial inner surface 42 avoids sharp edges which could cause a premature wear of the diaphragm material and supports the drive diaphragm 12 in a way which avoids its overstretching.

The axial length of the two insert bodies 24, 25 is expediently chosen such that the drive diaphragm 12 always remains axially within the ring interior spaces 33 in its drive movement 43. The two operating chambers 13, 14 nevertheless extend axially beyond the rear side of the two insert bodies 24, 25, each including that longitudinal section of the associated interior section 27, 28 which is located axially between the insert body 24, 25 and the associated end wall 54, 55.

The control passage structure 52 used for applying fluid to one or both of the operating chambers 13, 14 is formed at least partially in the drive housing 5, preferably in the drive housing wall 7 of the drive housing 5. By way of example, it comprises a first control passage 58 in continuous fluid connection with the first operating chamber 13 and a second control passage 59 in continuous fluid connection with the second operating chamber 14. The first control passage 58 is located behind the sectional plane in the sectional view of FIG. 3 and is therefore indicated by a broken line only.

The first control passage 58 terminates with a first connecting port 58a towards an outer surface of the drive housing 5. In a corresponding way, the second control passage 59 terminates with a second connecting port 59a likewise towards an outer surface of the drive housing 5. At least one and preferably both of the connecting ports 58a, 59a is/are located at the first drive housing part 15, by way of example on a terminating element 62 completing the first drive housing part 15 on the side axially opposite the joining region 17.

The first control passage 58 extends in the wall of the first drive housing part 15 parallel to the longitudinal axis 6 and terminates in a region axially spaced from the first insert body 24 into the interior section 27 via an inner passage orifice 58b.

If the first control passage 58 is used for the controlled application of fluid to the drive diaphragm 12, which does not apply to the illustrated embodiment, a drive fluid can optionally be fed into the first operating chamber 13 or discharged from the first operating chamber 13 through the first control passage 58. A dot-dash flow arrow 63 illustrates the fluid flow involved in this process.

If, as in the illustrated embodiment, the actuating force acting on the drive diaphragm 12 in the direction of its first maximally deflected position is provided by a spring device 53, the first control passage 58 is not used and can in this case be omitted completely or used as a breathing passage.

If the first control passage 58 is used as intended, however, the seal structure 56 prevents an unwanted fluid transfer from the first operating chamber 13 into the second operating chamber 14 through the intermediate region 57, which is located radially between the two insert bodies 24, 25 and the two drive housing parts 15, 16.

The second control passage 59 connects the second connecting port 59a to the second operating chamber 14 while bypassing the two insert bodies 24, 25.

In this context, the second control passage 59 has a first passage section 59b, which starts at the second connecting port 59a, passes through the wall of the first drive housing part 15 in its longitudinal direction and terminates, in a region located radially between the first insert body 24 and the first drive housing part 15, into a further passage section of the second control passage 59, which is represented by a first annular chamber 59c and located concentrically between the first insert body 24 and the first drive housing part 15.

This first annular chamber 59c forms an annular fluid duct chamber 64, which is a part of the second control passage 59 and extends around the first insert body 24.

The first fluid duct chamber 64 is sealed axially by the seal structure 56 on both sides. On the one hand, it is separated in a fluid-tight manner from the first operating chamber 13 via a first annular seal section 65 of the seal structure 56, on the other hand towards the joining region 17 via a second annular seal section 66 of the seal structure 56. Each annular seal section 65 provides a seal both in respect of the first insert body 24 and in respect of the first drive housing part 15. Both seal sections 65, 66 are expediently designed separate from the first insert body 24 and from the drive housing 5 and in the illustrated embodiment consist of annular sealing rings 67 held in receptacle grooves of the first insert body 24.

Adjoining the first annular chamber 59c represented by the first fluid duct chamber 64, the second control passage 59 continues in the wall of the drive housing 5 with a third passage section 59d composed of a sub-section formed in the first drive housing part 15 and a second sub-section formed in the second drive housing part 16, the sub-sections being in alignment in the joining region 17. The first sub-section of the third passage section 59d communicates with the first fluid duct chamber 64. The second sub-section of the third passage section 59d communicates with a further passage section of the second control passage 59, which is represented by a second annular chamber 59e. The second annular chamber 59e is arranged concentrically between the second insert body 25 and the second drive housing part 16 in the interior section 28 of the housing interior 8 formed in the second drive housing part 16 and represents a second annular fluid duct chamber 68, which is axially open towards the second operating chamber 14 on the one hand while on the other hand being sealed axially towards the joining region 17 via a third annular seal section 69 of the seal structure 56. The third annular seal section 69 seals radially between the second insert body 25 and the second drive housing part 16, being expediently a separate body in particular represented by a sealing ring held in a receptacle groove of the second insert body 25.

An annular gap 72 between the second insert body 25 and the second drive housing part 16 creates a permanent connection between the second fluid duct chamber 68 and the second operating chamber 14, offering the opportunity for optionally feeding a drive fluid into the second operating chamber 14 or discharging it from the second operating chamber 14 via the second connecting port 59a as indicated by the flow arrow 73.

The annular gap 72 facilitates a communication of the second control passage 59 with second operating chamber 14 axially outside of the second insert body 25. As the second insert body 25—and preferably the first insert body 24 as well—is/are annular, however, drive fluid can be applied in a controlled manner to the drive diaphragm 12 through the ring interior space 33 enclosed by the second insert body 25. This offers the advantage that the wall of the second insert body 25 and preferably that of the first insert body 24 as well can be designed without an opening, which applies to the illustrated embodiment. In the circumferential direction of the longitudinal axis 6, the wall of each insert body 24, 25 is expediently closed, so that no fluid exchange is possible through this wall.

The annular seal sections 65, 66, 69 are arranged coaxially with and at a radial distance from one another. Corresponding to the external shaping of the insert bodies 24, 25, they can have different diameters.

The diaphragm drive 2 is in particular designed for operation with compressed air as drive fluid. In principle, however, it can be operated with other pressure fluids as well, in particular with liquid pressure media.

At least one and preferably both of the connecting ports 58a, 59a is/are expediently located at an external end face section 74 of the first drive housing part 15. By way of example, this external end face section 74 is provided at the terminating element 62 mounted on the end face of a base unit 75 of the first drive housing part 15, the base unit 75 having a hood-shaped structure and defining that interior section 27 of the housing interior 8 which is formed in the first drive housing part 15. The first end wall 54 is a part of the base unit 75, being preferably fixed detachably, however. The terminating element 62 is located axially behind the first end wall 54. If we include the first terminating element 62, the first drive housing part 15 is preferably hood-shaped in design.

The second drive housing part 16 is in particular hood-shaped as well, the second end wall 55 being preferably an integral part of the second drive housing part 16. The rod-shaped output member 45 passes slidably through a wall opening 76 of the second end wall 55, which wall opening 76 expediently accommodates a guide sleeve for the linear guidance of the output member 45 and a sealing ring for dynamically sealing the output member 45 against the second drive housing part 16.

The location of the drive diaphragm 12 on the output member 45, which facilitates the transmission of drive forces, is expediently based on additional fastening means 77. By way of example, the fastening means 77 consist of two disc-shaped fastening plates 77a, 77b, which are perforated in the centre and secured to the output member 45 in any desired manner, in particular by a welded joint.

The invention claimed is:

1. A fluid-actuated diaphragm drive comprising a drive housing with two drive housing parts, which are attached to one another axially in a joining region while together bounding a housing interior, wherein a drive diaphragm, which separates two axially adjacent operating chambers from each other in a fluid-tight manner and which is motion-coupled to an output member is located in the housing interior, wherein the drive diaphragm is axially deflectable by the application of fluid to at least one of the operating chambers in order to induce an output movement of the output member, said application of fluid being controllable by means of a control passage structure, which is formed at least partially in the drive housing, and wherein the drive diaphragm is axially clamped in a sealing manner all around at its outer edge section between insert bodies, which are separate from the drive housing, each of which insert bodies is inserted into one of the two drive housing parts and forms a peripheral wall section adjoining the drive diaphragm of the associated operating chamber, wherein a seal structure is located radially between at least one of the insert bodies and the drive housing for radially sealing between the at least one of the insert bodies and the drive housing, and wherein the seal structure comprises a plurality of annular seal sections arranged coaxially and at an axial distance from one another.

2. A diaphragm drive according to claim 1, wherein the seal structure is designed separately from the insert bodies and from the drive housing.

3. The diaphragm drive according to claim 1, wherein two axially spaced annular seal sections are assigned to at least one insert body.

4. A fluid-actuated diaphragm drive comprising a drive housing with two drive housing parts, which are attached to one another axially in a joining region while together bounding a housing interior, wherein a drive diaphragm, which separates two axially adjacent operating chambers from each other in a fluid-tight manner and which is motion-coupled to an output member is located in the housing interior, wherein the drive diaphragm is axially deflectable by the application of fluid to at least one of the operating chambers in order to induce an output movement of the output member, said application of fluid being controllable by means of a control passage structure, which is formed at least partially in the drive housing, and wherein the drive diaphragm is axially clamped in a sealing manner all around at its outer edge section between insert bodies, which are separate from the drive housing, each of which insert bodies is inserted into one of the two drive housing parts and forms a peripheral wall section adjoining the drive diaphragm of the associated operating chamber, wherein a seal structure is located radially between at least one of the insert bodies and the drive housing for radially sealing between the at least one of the insert bodies and the drive housing, and wherein the two insert bodies are axially clamped together and to the drive diaphragm located in between without any direct clamping connection only by the axial pressure applied by the drive housing parts accommodating them.

5. The diaphragm drive according to claim 4, wherein each insert body has at least one support section, which is axially remote from the other insert body and against which the associated drive housing part bears with a mating support section, wherein the two drive housing parts are axially clamped together by clamping means acting between them, whereby the two insert bodies supported on the drive housing parts are clamped together as well.

6. A fluid-actuated diaphragm drive comprising a drive housing with two drive housing parts, which are attached to one another axially in a joining region while together bounding a housing interior, wherein a drive diaphragm, which separates two axially adjacent operating chambers from each other in a fluid-tight manner and which is motion-coupled to an output member is located in the housing interior, wherein the drive diaphragm is axially deflectable by the application of fluid to at least one of the operating chambers in order to induce an output movement of the output member, said application of fluid being controllable by means of a control passage structure, which is formed at least partially in the drive housing, and wherein the drive diaphragm is axially clamped in a sealing manner all around at its outer edge section between insert bodies, which are separate from the drive housing, each of which insert bodies is inserted into one of the two drive housing parts and forms a peripheral wall section adjoining the drive diaphragm of the associated operating chamber, wherein a seal structure is located between at least one of the insert bodies and the drive housing, and wherein the two insert bodies together with the drive housing form at least one fluid duct chamber belonging to the control passage structure.

7. The diaphragm drive according to claim 6, wherein the two insert bodies are designed to be annular while framing a ring interior space, wherein the control passage structure opens into the ring interior space so that the controlled application of fluid of the drive diaphragm takes place through the ring interior space enclosed by the two insert bodies.

8. The diaphragm drive according to claim 6, wherein each of the two insert bodies together with the associated drive housing part of the two drive housing parts forms a part of the at least one fluid duct chamber belonging to the control passage structure.

9. The diaphragm drive according to claim 6, wherein the control passage structure has a connecting port located on the one axial side of the drive diaphragm on the outside of the drive housing and usable for fluid infeed and fluid discharge, and wherein the control passage structure is routed within of the drive housing by means of the at least one fluid duct chamber to the other axial side of the drive diaphragm, in order to communicate with the operating chamber located there.

10. The diaphragm drive according to claim 6, wherein the two insert bodies are designed to be annular, each having a front annular opening and a rear annular opening axially opposite in respect thereof, wherein their front annular openings face each other.

11. The diaphragm drive according to claim 10, wherein the front annular openings of the two insert bodies have a larger cross-section than their rear annular openings.

12. A fluid-actuated diaphragm drive comprising a drive housing with two drive housing parts, which are attached to one another axially in a joining region while together bounding a housing interior, wherein a drive diaphragm, which separates two axially adjacent operating chambers from each other in a fluid-tight manner and which is motion-coupled to an output member is located in the housing interior, wherein the drive diaphragm is axially deflectable by the application of fluid to at least one of the operating chambers in order to induce an output movement of the output member, said application of fluid being controllable by means of a control passage structure, which is formed at least partially in the drive housing, and wherein the drive diaphragm is axially clamped in a sealing manner all around at its outer edge section between insert bodies, which are separate from the drive housing, each of which insert bodies is inserted into one of the two drive housing parts and forms a peripheral wall section adjoining the drive diaphragm of the associated operating chamber, wherein a seal structure is located between at least one of the insert bodies and the drive housing, and wherein the two insert bodies are designed to be annular, each having a radially inward inner ring section forming a peripheral wall section of an operating chamber and a radially outward outer ring section coaxially enclosing the inner ring section, wherein the two ring sections are integrally connected to each other at the front side of the insert body facing the drive diaphragm.

13. The diaphragm drive according to claim 12, wherein each of the insert bodies has a radial inner surface which forms the peripheral wall section, the radial inner surface having a convex curvature immediately after the drive diaphragm and a concave curvature immediately thereafter.

14. The diaphragm drive according to claim 12, wherein an intermediate space with a cross-section widening from the front towards the rear of the insert body is formed radially between the two ring sections.

15. A fluid-actuated diaphragm drive comprising a drive housing with two drive housing parts, which are attached to one another axially in a joining region while together bounding a housing interior, wherein a drive diaphragm, which separates two axially adjacent operating chambers from each other in a fluid-tight manner and which is motion-coupled to an output member is located in the housing interior, wherein the drive diaphragm is axially deflectable by the application of fluid to at least one of the operating chambers in order to induce an output movement of the output member, said application of fluid being controllable by means of a control passage structure, which is formed at least partially in the drive housing, and wherein the drive diaphragm is axially clamped in a sealing manner all around at its outer edge section between insert bodies, which are separate from the drive housing, each of which insert bodies is inserted into one of the two drive housing parts and forms a peripheral wall section adjoining the drive diaphragm of the associated operating chamber, wherein a seal structure is located radially between at least one of the insert bodies and the drive housing for radially sealing between the at least one of the insert bodies and the drive housing, and wherein the two drive housing parts are made of metal, and the two insert bodies are made of a plastic material.

16. The diaphragm drive according to claim 15, wherein the seal structure comprises one sealing ring or a plurality of sealing rings wherein each sealing ring is arranged to be coaxial with the insert bodies.

17. The diaphragm drive according to claim 15, wherein precisely two axially spaced annular seal sections are assigned to the one insert body and only one annular seal section is assigned to the other insert body.

18. The diaphragm drive according to claim 15, wherein the seal structure comprises an annular sealing ring held in a receptacle groove formed in an outer radial circumferential surface of one of the insert bodies, the receptacle groove having a radial opening and being axially confined on both sides by the insert body, whereby the seal structure seals only radially between the one of the insert bodies and the drive housing.

19. A fluid-actuated diaphragm drive comprising a drive housing with two drive housing parts, which are attached to one another axially in a joining region while together bounding a housing interior, wherein a drive diaphragm, which separates two axially adjacent operating chambers from each other in a fluid-tight manner and which is motion-coupled to an output member is located in the housing interior, wherein the drive diaphragm is axially deflectable by the application of fluid to at least one of the operating chambers in order to induce an output movement of the output member, said application of fluid being controllable by means of a control passage structure, which is formed at least partially in the drive housing, and wherein the drive diaphragm is axially clamped in a sealing manner all around at its outer edge section between insert bodies, which are separate from the drive housing, each of which insert bodies is inserted into one of the two drive housing parts and forms a peripheral wall section adjoining the drive diaphragm of the associated operating chamber, wherein a seal structure is located radially between at least one of the insert bodies and the drive housing for radially sealing between the at least one of the insert bodies and the drive housing, and wherein the control passage structure communicates with both of the two operating chambers, so that fluid can be applied in a controlled manner to both operating chambers for generating the output movement of the output member.

20. A fluid-actuated diaphragm drive comprising a drive housing with two drive housing parts, which are attached to one another axially in a joining region while together bounding a housing interior, wherein a drive diaphragm, which separates two axially adjacent operating chambers from each other in a fluid-tight manner and which is motion-coupled to an output member is located in the housing interior, wherein the drive diaphragm is axially deflectable by the application of fluid to at least one of the operating chambers in order to induce an output movement of the output member, said application of fluid being controllable by means of a control passage structure, which is formed at least partially in the drive housing, and wherein the drive diaphragm is axially clamped in a sealing manner all around at its outer edge section between insert bodies, which are separate from the drive housing, each of which insert bodies is inserted into one of the two drive housing parts and forms a peripheral wall section adjoining the drive diaphragm of the associated operating chamber, wherein a seal structure is located radially between at least one of the insert bodies and the drive housing for radially sealing between the at least one of the insert bodies and the drive housing, and wherein a spring device acting between the drive diaphragm and the drive housing and preloading the drive diaphragm into a home position is located in one of the operating chambers.

21. A fluid-actuated diaphragm drive comprising a drive housing with two drive housing parts, which are attached to one another axially in a joining region while together bounding a housing interior, wherein a drive diaphragm, which separates two axially adjacent operating chambers from each other in a fluid-tight manner and which is motion-coupled to an output member is located in the housing interior, wherein the drive diaphragm is axially deflectable by the application of fluid to at least one of the operating chambers in order to induce an output movement of the output member, said application of fluid being controllable by means of a control passage structure, which is formed at least partially in the drive housing, and wherein the drive diaphragm is axially clamped in a sealing manner all around at its outer edge section between insert bodies, which are separate from the drive housing, each of which insert bodies is inserted into one of the two drive housing parts and forms a peripheral wall section adjoining the drive diaphragm of the associated operating chamber, wherein a seal structure is located radially between at least one of the insert bodies and the drive housing for radially sealing between the at least one of the insert bodies and the drive housing, and wherein the output member is designed to be rod-shaped and slidably extends outwards through at least one of the drive housing parts.

\* \* \* \* \*